(12) United States Patent
Shepherd et al.

(10) Patent No.: US 8,515,454 B2
(45) Date of Patent: Aug. 20, 2013

(54) METHOD OF DETERMINING THE LOCATION OF A NODE IN A DISTRIBUTED WIRELESS SENSOR AND ACTUATOR NETWORK

(75) Inventors: Christopher Robert Shepherd, Swindon (GB); Jonathan Richard Matthews, Cheshire (GB)

(73) Assignee: NXP B.V., Eindhoven (NL)

( * ) Notice: Subject to any disclaimer, the term of this patent is extended or adjusted under 35 U.S.C. 154(b) by 585 days.

(21) Appl. No.: 11/880,652

(22) Filed: Jul. 23, 2007

(65) Prior Publication Data

US 2009/0028077 A1    Jan. 29, 2009

(51) Int. Cl.
*H04W 24/00* (2009.01)

(52) U.S. Cl.
USPC ............... 455/456.2; 455/456.1; 455/456.3; 342/118; 342/357.2

(58) Field of Classification Search
USPC ............... 455/456.1–456.3; 342/118, 357.2
See application file for complete search history.

(56) References Cited

U.S. PATENT DOCUMENTS

| | | | | |
|---|---|---|---|---|
| 6,400,754 | B2 * | 6/2002 | Fleming et al. | 375/140 |
| 6,861,982 | B2 * | 3/2005 | Forstrom et al. | 342/387 |
| 7,289,813 | B2 * | 10/2007 | Karaoguz | 455/456.1 |
| 2008/0153509 | A1 * | 6/2008 | Piekarski | 455/456.2 |
| 2008/0219201 | A1 * | 9/2008 | Challapali et al. | 370/312 |

* cited by examiner

*Primary Examiner* — Amancio Gonzalez

(57) ABSTRACT

Embodiments of the invention comprise a method of determining a position of a node, comprising receiving a communication from the node; determining a timing of the receiving; and calculating a position of the node from the timing.

54 Claims, 5 Drawing Sheets

METHOD OF DETERMINING THE LOCATION OF A NODE IN A DISTRIBUTED WIRELESS SENSOR AND ACTUATOR NETWORK

FIELD OF THE INVENTION

Embodiments of this invention relate to a data processing method and system, for example for determining the position of a node.

BACKGROUND TO THE INVENTION

In traditional wireless networks, nodes can communicate with each other. For example, a first node (the source node) may send information to a second node (the destination node), and the second node (the source node) may send information to a first node (the destination node). The information may include information that identifies the source node and/or the destination node. The source node is a transmitter and the destination node is a receiver, although the source node may include the capability for receiving and/or the destination node may include the capability for transmitting.

It is an object of embodiments of the invention to at least mitigate one or more of the problems of the prior art.

SUMMARY OF THE INVENTION

According to a first aspect of embodiments of the invention, there is provided a method of determining a position of a node, the method comprising receiving a communication from the node; determining a timing of the receiving; and calculating a position of the node from the timing.

Thus the position of the node can be determined from, for example, a communication received from the node. The timing of the node can be used to determine the time taken for the communication to travel from the node, and therefore the distance that the communication has traveled. This distance can be used to determine the position of the node.

The timing may comprise, for example, the time the communication was received. This may, for example, be compared with the time the communication was sent to determine the time taken for the communication to travel from the node.

In certain embodiments, the method comprises sending a request for the communication to the node, and determining the timing comprises determining a time difference between the sending and the receiving. Thus, the communication is sent by the node only on request. A timer, for example, can be used to determine the time difference. Preferably, calculating the position of the node comprises calculating the distance traveled by the communication from the time difference. Preferably, the communication is an acknowledgement of the request. Therefore, for example, in standard wireless networks a standard communication such as an acknowledgement may be used when determining the position of the node. Preferably, the method comprises receiving an indication of a turnaround time of the node from the node, and wherein the time difference includes the turnaround time. Therefore, the turnaround time, which is the time taken for the node to send the communication once it has received the request, can be subtracted from the time difference. Preferably, the method comprises receiving, from the node, an indication of a fraction of a clock cycle between when the request is received by the node and a clock edge when receipt of the request is detected by the node, and wherein the time difference includes the fraction of a clock cycle. Therefore, the fraction of a clock cycle (which may be indicated, for example, in the form of a length of time) can be subtracted from the time difference. Subtracting the fraction of the clock cycle and/or the turnaround time from the time difference may lead to a more accurate determination of the distance that the communication has traveled and, therefore, a more accurate determination of the position of the node.

In certain embodiments, determining the timing comprises determining a fraction of a clock cycle between when the communication is received and a clock edge when receipt of the communication is detected. Therefore, this fraction of a clock cycle can be subtracted from the time at which receipt of the communication is detected, which may lead to a more accurate determination of the position of the node.

In certain embodiments, determining the timing comprises determining the time taken between sending of the communication by the node and the receiving. This time taken can be used in determining the distance the communication has traveled, which may then be used to determine the position of the node.

According to a second aspect of embodiments of the invention, there is provided a method of determining the position of a node, the method comprising receiving, at a plurality of receivers, at least one communication from a node; determining a plurality of respective timings for the receiving; and calculating a position of the node from a plurality of respective timings.

Thus, for example, the position of the node can be determined from a plurality of times, each time being the time taken for the communication to be sent from the node to one of the receivers.

According to a third aspect of embodiments of the invention, there is provided a system for determining the position of a node, the system comprising a plurality of receivers for receiving communications from the node; means for determining a respective timing for a communication received by a respective one of the receivers; and means for determining the position of the node from at least one of the respective timings.

According to a fourth aspect of embodiments of the invention, there is provided a communications device arranged to receive a request for a turnaround time from a node; and send an indication of the turnaround time to the node.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the invention include a method of determining the position of a node based on timing of a communication received from the node. For example, the timing comprises the time taken between sending of the communication and receipt of the communication, and can be used to determine the distance that the communication has traveled and, therefore, how far away the node is. For example, if the time of receipt of the communication is known, and the time of sending of the communication is known, then the time taken between sending and receiving can be determined. Alternatively, for example, if the communication is a response to a request, then the timing comprises the time taken between sending of the request and receipt of the response communication, and can be used to determine how far away the node is. The distance to the node may be used in determining the position of the node.

In certain embodiments of the invention, a single receiver can be used to determine the position of the node. For example, it may be required to know whether the node is within a certain distance from a receiver (for example, whether the node is in the same room as the receiver). In such a scenario, a single receiver could be used to determine whether the node is far enough away from the receiver to be outside of the room in which the receiver is located. Alternatively, for example, a receiver positioned at one end of an elongate room or space may be used to determine the approximate location of the node along the length of the room or space. The distance of a node from the receiver provides a sphere around the receiver of the possible positions of the node, and if the node cannot be located in many of the positions (for example, because these positions are located outside of the room or space) then the number of possible positions of the node may be reduced significantly.

In other embodiments of the invention, multiple receivers may receive the communication from the node and each receiver may determine the distance between the node and the respective receiver. Thus, the position of the node can be determined using distances from multiple points. For example, four receivers at known locations may be used to determine the position of the node within a three-dimensional space. However, more receivers may be used to determine the position more accurately and/or may be used to improve coverage of the receiver network. Alternatively, fewer receivers may be used where an approximate position of the node is sufficient and/or there is a limited number of positions where the node may be located.

Figure 1:
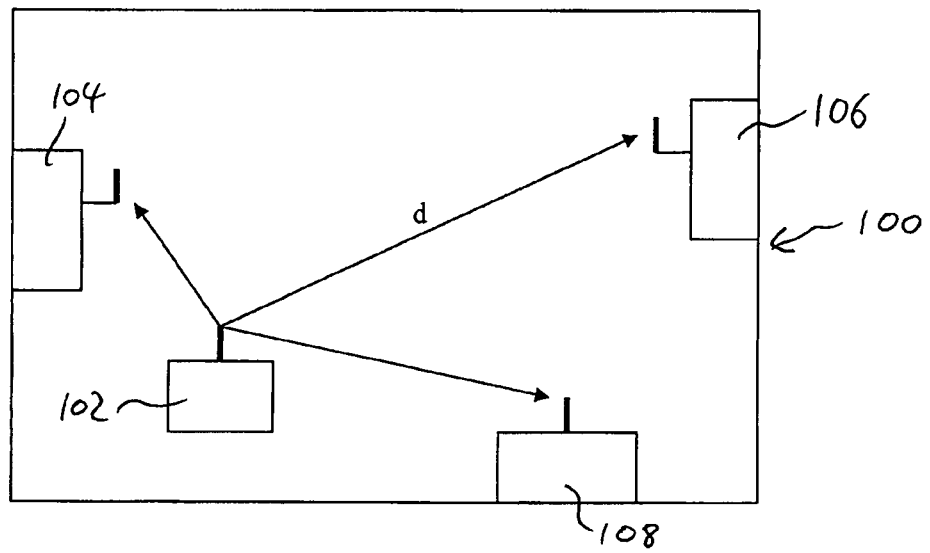
FIG. 1 shows an example of a wireless network according to embodiments of the invention.

FIG. 1 shows an example of a wireless network 100 according to embodiments of the invention. The network 100 comprises a node 102 and three receivers 104, 106 and 108. One or more of the receivers 104, 106 and 108 may also be able to transmit communications to the node 102, and as such comprise transceivers. Similarly, the node 102 may be able to receive communications from one or more of the receivers 104, 106 and 108. In certain embodiments of the invention, the network is a Zigbee network, and each of the node 102 and receivers 104, 106 and 108 comprise nodes in the Zigbee network that can both transmit communications to other nodes and receive communications from other nodes. One of the nodes may also comprise a coordinator in the Zigbee network. The Zigbee specification is based on the IEEE 802.15.4 communication standard. In other embodiments of the invention, the network is another type of network, such as another type of IEEE 802.15.4 network.

The receivers 104, 106 and 108 tend to be devices that are fixed in position, and will therefore be referred to hereinafter as fixed devices. The node 102 may be a remote device, i.e. its position may change over time, and hence the position of the node cannot be preprogrammed (as may be the case for the fixed devices). The node 102 will be referred to hereinafter as a remote device. The remote device 102 may communicate wirelessly with the fixed devices using some wireless protocol, such as Zigbee, although one or more other suitable protocols may be used. The fixed devices may communicate wirelessly with each other, or alternatively some or all of the fixed devices may be connected by a wired network and may communicate with each other using the wired network.

Figure 2:
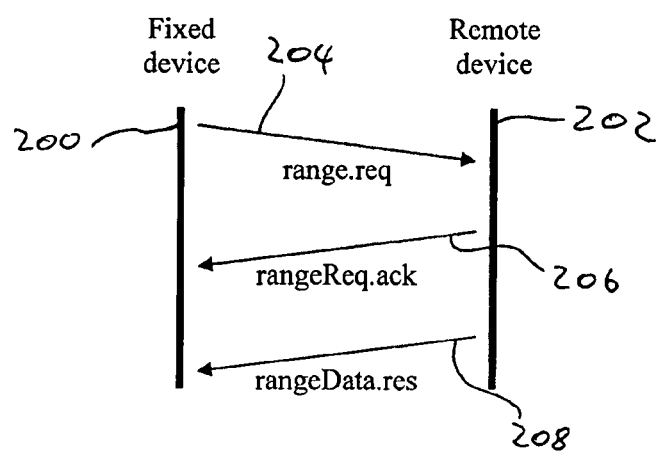
FIG. 2 shows an example of communications sent between a fixed device and a remote device in a method according to embodiments of the invention.

FIG. 2 shows an example of communications sent between a fixed device 200 and a remote device 202 when determining the position of the remote device 202 according to embodiments of the invention, or at least to determine the distance between the fixed device 200 and the remote device 202. The fixed device 200 and remote device 202 comprise communications devices that may be, for example, receivers and/or transmitters in a network. Firstly, the fixed device 200 sends a communication 204, called range.req, to the remote device 202. The communication 204 may comprise, for example, one or more packets. In embodiments of the invention, the communication 204 comprises a single packet. Once the remote device 202 receives the communication, it sends an acknowledgement communication 206, called rangeReq.ack, to the fixed device 200. Next, the remote device 202 sends a communication 208, called rangeData.res, to the fixed device 200. The communication 208 contains timing information about the timing of receipt of the communication 204 by the remote device 202.

The timing information in the communication 204, in embodiments of the invention, indicates a value of "delta", which is a measure of the time between when the communication 204 is received by the remote device 202 and when the remote device 202 first detects that the communication 204 is being received, which is typically on a rising clock edge of an internal clock of the remote device 202. Therefore, the value of delta is less than the period of the internal clock, and hence comprises a fraction of the period, i.e. a fraction of a clock cycle.

Figure 3:
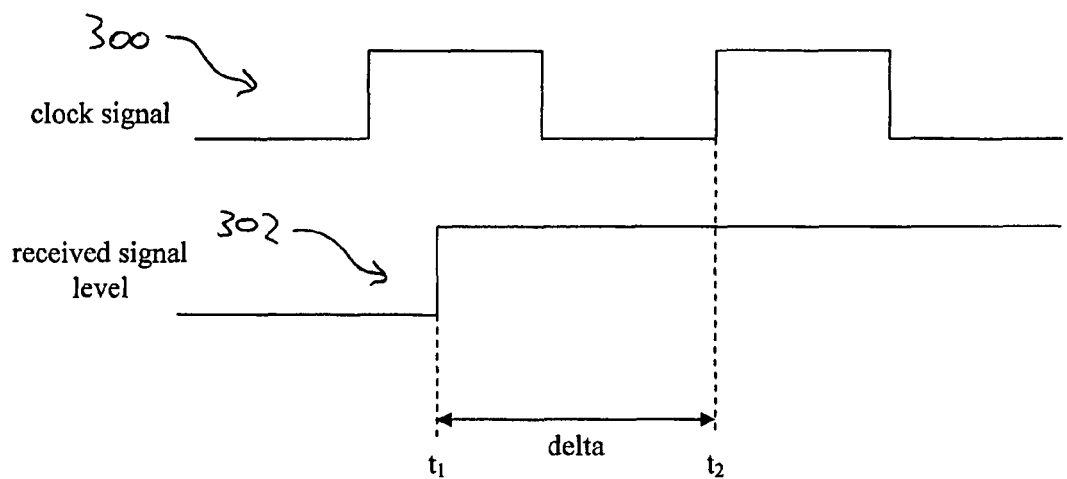
FIG. 3 illustrates a fraction of a clock cycle between receipt of a communication and detection of the receipt.

FIG. 3 illustrates the value of delta. The remote device 202 includes an internal clock signal 300 that is used in a receiver in the remote device. The remote device 202 receives a communication (such as, for example, the communication 204 shown in FIG. 2) over a period of time as indicated by the received signal level 302. The communication first reaches the remote device 202 at a time $t_1$, and at this point the communication is received by the remote device 202. However, the remote device 202 does not detect that the communication is being received until the next rising clock edge, which is at time $t_2$. The value of delta is the time difference between $t_1$ and $t_2$, as shown in FIG. 3.

The value of delta may be important in a situation where the frequency of the clock signal 300 is low enough so that ignoring the value of delta (for example, by not determining the value of delta and not using delta when determining the distance between the fixed and remote devices) may cause a significant error when determining the distance between the fixed and remote devices. As communications within the wireless network comprise electromagnetic signals, in a very short period of time the signal may have traveled a significant distance. For example, if the frequency of the clock signal 300 is 16 MHz, then the value of delta may be up to one clock cycle, i.e. up to 62.5 ns. The speed of light in a vacuum is approximately $3 \times 10^8$ meters per second. Therefore, the communication may travel up to approximately 18.75 m during the delta period indicated in FIG. 3. If, for example, it is desired to determine the distance between the fixed device and the remote device to an error of less than approximately 18.75 m, then determining and using the value of delta may allow a more accurate measurement of the distance.

Figure 4:
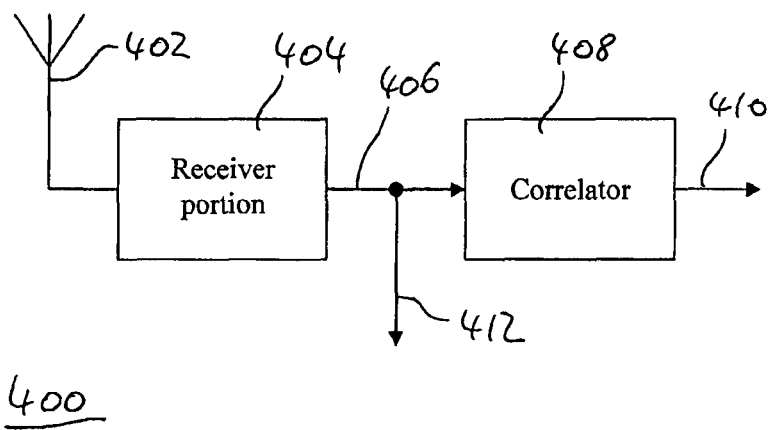
FIG. 4 shows an example of apparatus for determining a fraction of a clock cycle according to embodiments of the invention.

FIG. 4 shows an example of apparatus 400 for determining the value of delta according to embodiments of the invention. The apparatus 400 may, for example, comprise a node or may be contained within a node. The apparatus 400 includes an antenna 402, and a receiver portion 404 for receiving communications from other nodes via the antenna 402. The receiver portion 404 demodulates received communications and provides an output 406 comprising a received data bit stream. In embodiments of the invention, for example where the 802.15.4 communication standard is used, a received communication comprises one or more 32-bit sequences, each 32-bit sequence indicating four data bits. The output 406 is provided to a correlator 408 that determines a timing of a received communication, such as, for example, the fraction of a clock cycle between receipt of the communication and first detection of the receipt of the communication. As a communication is received over a period of time by the receiver, receipt of the communication is the point in time when the communication first starts to reach the receiver.

The correlator 408 provides an output 410 that indicates the fraction of the clock cycle. The apparatus 400 may also provide the output 406 of the receiver portion 404 to other parts of the apparatus (not shown) as indicated by arrow 412.

Figure 5:
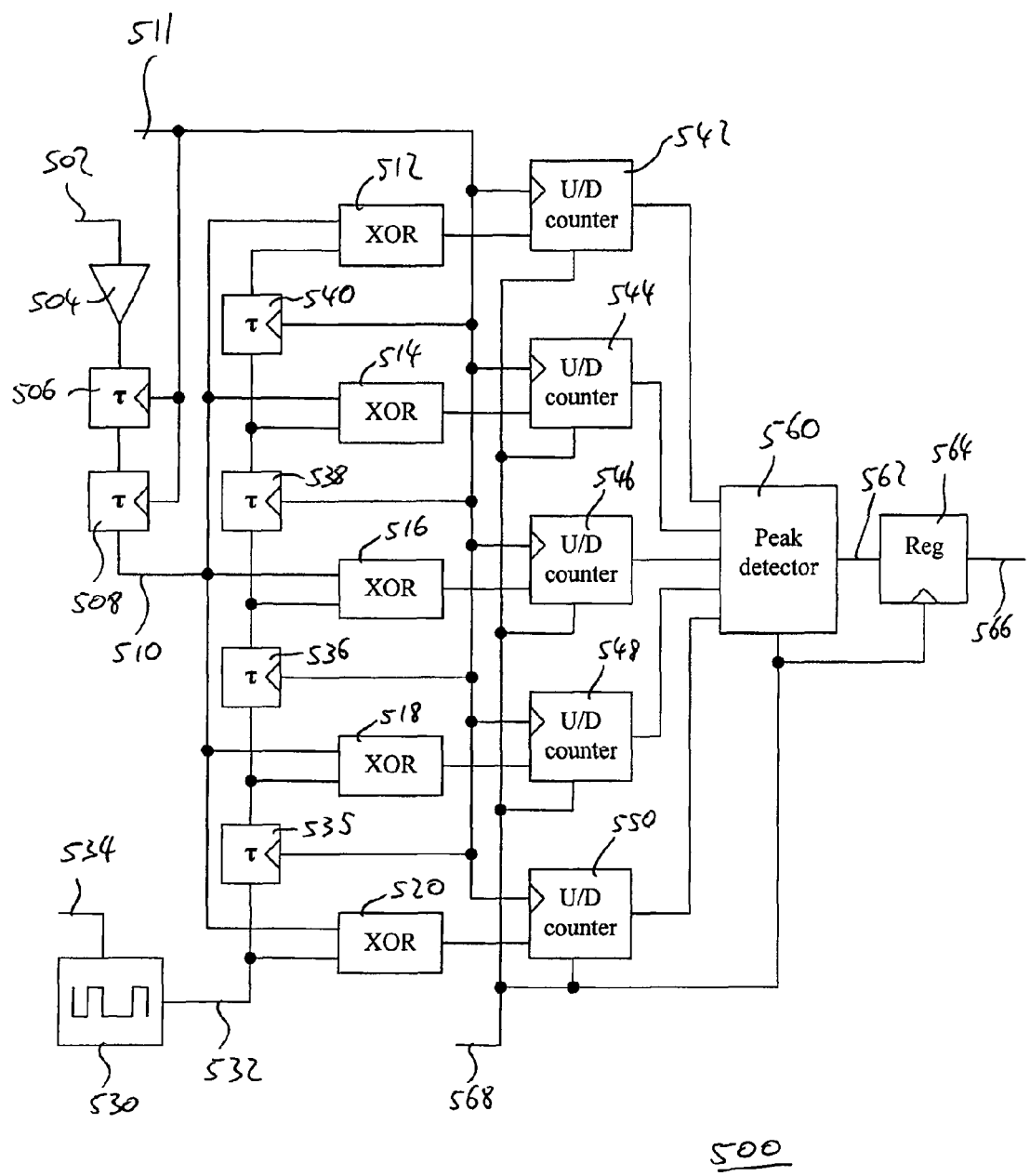
FIG. 5 shows a correlator according to embodiments of the invention.

FIG. 5 shows an example of a correlator 500 according to embodiments of the invention. The correlator receives an input 502 which comprises the output 406 of the receiver portion 404 shown in FIG. 4. The input 502 therefore comprises a bit stream. The input signal 502 is provided to a buffer 504 and then to two serially connected delay units 506 and 508, each of which delay the signal by a delay factor τ. Thus, the output of the second delay unit 508 comprises a signal 510 which is the input signal 502 delayed by 2τ. The delay units are controlled by a clock signal 511. The signal 510 is provided to one input of each of five XOR logic units 512, 514, 516, 518 and 520 (other embodiments of the invention may include any number of XOR logic units). Each XOR logic unit performs an XOR operation on its two inputs and provides the result as a binary logic output.

A chipping sequence generator 530 generates a chipping sequence 532 according to a chipping sequence phase input 534 to the correlator 500. The chipping sequence 532 matches a received communication. For example, where an 802.15.4 communications standard is used, the chipping sequence phase input 534 is used to control the chipping sequence generator 530 such that the chipping sequence 532 comprises a 32-bit sequence that matches the 32-bit sequence provided to the correlator 500. The chipping sequence 532 is provided to the second input of the XOR logic unit 520 and a delay unit 535. The output of the delay unit 535 is provided to the second input of the XOR logic unit 518 and another delay unit 536. The output of the delay unit 536 is provided to the second input of the XOR logic unit 516 and another delay unit 538. The output of the delay unit 538 is provided to the second input of the XOR logic unit 514 and another delay unit 540. The output of the delay unit 540 is provided to the second input of the XOR logic unit 512. Thus, therefore, the time difference between the received signal as seen by the XOR logic units and the chipping sequence as seen by the XOR logic units is +2τ, +τ, 0, −τ and −2τ for the XOR logic units 512, 514, 516, 518 and 520 respectively. That is, for example, the received signal reaches the XOR logic unit 520 −2τ later than the chipping sequence signal 532. The delay units 535, 536, 538 and 540 are controlled by the clock signal 511.

The outputs of the XOR logic units 512, 514, 516, 518 and 520 are provided to up/down counters 542, 544, 546, 548 and 550 respectively. The up/down counters increase or decrease their respective outputs on each pulse from the clock signal 511, according to whether the input from the corresponding XOR logic unit is high or low. For example, in embodiments of the invention, an up/down counter increases its output on a clock pulse when the input is high, and decreases its output if the input is low.

The outputs of the up/down counters 542, 544, 546, 548 and 550 are provided to a peak detector 560. The peak detector determines the timing of a received communication from the outputs of the up/down counters as described in more detail below. An output 562 of the peak detector 560 indicates the timing and is provided to a register 564 that stores the indication or the timing. The output of the register 566 comprises the output of the correlator 500.

The up/down counters can be reset using a reset signal input 568. The reset signal 568 is also used to clock the output 562 of the peak detector 560 into the register 564.

The operation of the correlator will now be described. The phase of the chipping sequence 532 is matched approximately to the phase of the input signal 502. For example, the apparatus 400 shown in FIG. 4 detects a start of frame delimiter (SFD) at the start of a communication being received by the receiver, and uses the SFD to determine the phase of the chipping sequence of the incoming communication as is known in the art. The apparatus 400 may include correlation apparatus (not shown) that detects the SFD and/or determines the phase of the chipping sequence. The phase of the chipping sequence is specified to the correlator 500 via the chipping sequence phase input 534.

In embodiments of the invention, for example where the Zigbee communications standard or another 802.15.4 communications standard is used for wireless communications, data contained within a communication is grouped into sets of four bits. A set of four data bits is used to select one of 16 unique 32-bit sequences defined by the 802.15.4 standard, and the selected 32-bit sequence is transmitted eight times faster than the bit rate of the data bits using an offset quadrature phase shift keying (OQPSK) modulation technique. Thus, the four bit code is transmitted using a spread-spectrum technique. A receiver may identify the 32-bit sequence and thus identify the four data bits being transmitted. A receiver can determine the positions of boundaries between 32-bit sequences by identifying the start of frame delimiter (SFD) as above, which provides a reference point in time for identifying separate 32-bit sequences.

Therefore, the two signals provided to each of the XOR logic units 512, 514, 516, 518 and 520 are identical, except for a phase delay between the two inputs to each XOR logic unit. For example, if the phase of the input signal 502 and chipping sequence signal 534 are exactly aligned in phase, then there is no phase difference between the two signals provided to the XOR logic unit 516, although there is, for example, a +τ delay between the signals provided to the XOR logic unit 514. Similarly, for example, if there is a +τ delay between the phases of the input signal 502 and the chipping sequence signal 534, then there is no phase difference between the two signals provided to the XOR logic unit 514, although there is, for example, a +τ delay between the signals provided to the XOR logic unit 512, and a −τ delay between the signals provided to the XOR logic unit 516. The time difference between the signals may comprise a value other than an integer multiple of τ.

If the signals provided to an XOR logic unit are exactly aligned in phase, then the output of the XOR logic unit will always be logic 0 (low). However, a phase difference between the signals provided to an XOR logic unit causes the output of the XOR logic unit to occasionally be logic 1 (high). A greater phase difference causes the output of the XOR logic unit to be high more often and/or for longer periods. Therefore, a greater phase difference causes, over a period of time (the correlation period), an associated up/down counter to count to a higher number.

At the start of the correlation period, a reset signal is sent to the correlator using the reset signal input 568. This causes the up/down counters 542, 544, 546, 548 and 550 to be reset to zero. At the end of the correlation period, which comprises a plurality of clock cycles of the clock signal 511, another reset signal is sent to the correlator, and this causes the peak detector 560 to calculate a peak phase difference value using the inputs from the up/down counters 542, 544, 546, 548 and 550 as indicated in more detail below, and for this value to be stored in the register 564. This also causes the outputs of the up/down counters to be reset to zero again.

Figure 6:
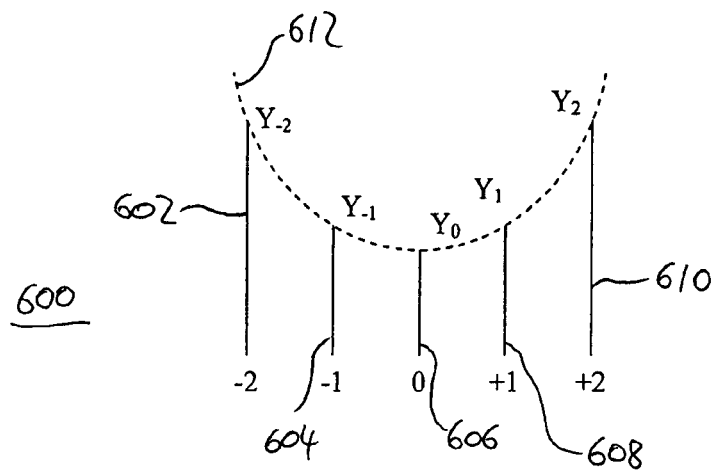
FIG. 6 shows a graph of the values presented to the peak detector in the correlator.

An example of the possible relative values of the outputs of the up/down counters before they are reset are shown in the graph 600 of FIG. 6. The sizes of the lines 602, 604, 606, 608 and 610 correspond to the values $Y_{-2}, Y_{-1}, Y_0, Y_1$ and $Y_2$ of the outputs of the XOR logic units 520, 518, 516, 514 and 512 respectively. The values of the outputs form a curve 612 which approximates a quadratic curve. The horizontal axis (x) of the curve 612 represents a proportion of the value of τ, introduced by the correlator, of time between the input signal 502 and the chipping sequence signal 532 as seen by each XOR logic unit 512-520 (as shown in FIG. 5). For example, an x value of −2 indicates a −2τ time difference, which is the time difference seen by the XOR logic unit 512 (or, in alternative embodiments of the invention the XOR logic unit 512, where a negative time difference indicates that the chipping sequence 532 precedes the input signal 502). The vertical axis (y) can be regarded as the number of errors recorded by an XOR logic unit at that delay value. The minimum of the curve 612 occurs where the delay proportion x approximately matches the time difference between the input signal 502 and the chipping sequence signal 532. This value of x may or may not be an integer (and, therefore, the phase difference between the input signal and chipping sequence signal may or may not be an integer multiple of τ). Therefore, curve fitting/interpolation is used to determine a value of x where the value of y is at a minimum.

An example of curve fitting (performed by the peak detector 560) is described below, although other curve fitting/interpolation techniques may additionally or alternatively be used. The lowest three points (i.e. the lowest value and the values either side of the lowest value, where appropriate) are taken for simplicity, and are fitted to the following quadratic equation:

$$y = Ax^2 + Bx + C \quad (1)$$

For the curve shown in FIG. 6, the values $Y_{-1}, Y_0$ and $Y_1$ are the lowest three values. Three simultaneous equations are formed by inserting these values and their corresponding x values into equation (1):

$$Y_{-1} = A - B + C \quad (2a)$$
$$Y_0 = C \quad (2b)$$
$$Y_{+1} = A + B + C \quad (2c)$$

Solving these equations (2a), (2b) and (2c) yields the coefficients of (1):

$$B = \frac{1}{2}(Y_{+1} - Y_{-1}) \quad (3a)$$

$$A = \frac{1}{2}(Y_{+1} + Y_{-1} - 2Y_0) \quad (3b)$$

Equation (1) can be differentiated to determine the slope of the curve:

$$\frac{dy}{dx} = 2Ax + B \quad (4)$$

The minimum of the curve occurs where the slope is zero, i.e.:

$$x = -\frac{B}{2A} \quad (5)$$

Using the values of A and B from equations (3a) and (3b), x at the minimum can be determined as follows:

$$x = \frac{1}{2}\left(\frac{Y_{-1} - Y_{+1}}{Y_{+1} + Y_{-1} - 2Y_0}\right) \quad (6)$$

This is relatively simple to implement using hardware. However, higher order curves and/or fitting more points may require more complex hardware.

The value of x obtained from equation 6 above can be used to determine the time difference between the input signal 502 and the chipping sequence 532 (for example, the time difference is xτ). In embodiments of the invention, this time difference is also delta, the time difference between first receipt of the communication and first detection of the communication, as the clock signal used to control the chipping sequence generator 530 is also the clock signal used to detect incoming communications.

As shown in FIG. 2, once the range.req communication 204 is received by the remote device 202, the remote device 202 sends a rangeReq.ack communication 206 to the fixed device 200. The fixed device 200 includes means for determining a timing of receipt of the communication 200. For example, the fixed device 200 includes a correlator 500 as shown in FIG. 5 for determining a time difference between receipt of the communication 206 and detection of receipt of the communication 206.

The fixed device also includes means for determining the total time $t_1$ between sending of the range.req communication 204 and detection of receipt of the rangeReq.ack communication 206. This may be determined using, for example, a timer.

According to the 802.15.4 specification, an acknowledgement communication must be sent 192 μs (the "turnaround time") after detection of receipt of the original communication is detected. Therefore, the rangeReq.ack communication 206 is sent (that is, sending of the communication is commenced) 192 μs after receipt of the range.req communication 204. The fixed delay is achieved by detecting the receipt of the original communication on a clock edge, and starting transmission of the acknowledgement communication on another, later clock edge.

The remote device 202 also sends a rangeData.res communication 208 to the fixed device 200. The communication 208 indicates the value of delta measured by the remote device 202. In embodiments of the invention, the communication 208 does not indicate the delay between detection of receipt of the communication 204 and sending of the acknowledgement communication 206, although in other embodiments this value may also be included, for example where this delay is not fixed or is unknown.

Once the fixed device 200 has received the rangeData.res communication 208, it can calculate the distance traveled by both the range.req communication 204 and the rangeReq.ack communication 206, and can therefore calculate the distance between the fixed device 200 and remote device 202 as follows:

$$d = ct_c = c(t_t - (192 \times 10^{-6} + \Delta_R + \Delta_F)) \quad (7)$$

where
- d is the distance between the fixed device 200 and remote device 202;
- c is the speed of light in a vacuum; in other embodiments of the invention, where communications are sent using a medium other than electromagnetic signals, the value of c is the speed of the communications;
- $t_c$ is the total time taken for the range.req communication 204 to travel from the fixed device 200 to the remote device 202 and for the rangeReq.ack communication 206 to travel from the remote device 202 to the fixed device 200;
- $192 \times 10^{-6}$ is the turnaround time of the rangeReq.ack communication 206, not including any delta values. This time may be different in other embodiments of the invention and may be variable;
- $\Delta_R$ is the value of delta measured by the remote device 202 in respect of the range.req communication 204; and
- $\Delta_F$ is the value of delta measured by the remote device 200 in respect of the rangeReq.ack communication 206.

The distance between the fixed device 200 and the remote device 202 may be used to determine the position of the remote device 202 as appropriate. In embodiments of the invention where there are multiple fixed devices, each fixed device may determine its distance from the remote device 202, and therefore the distance of the remote device 202 from multiple points is known. Thus, for example, trilateration (or multilateration) may be used to determine the position of the remote device 202.

Figure 7:
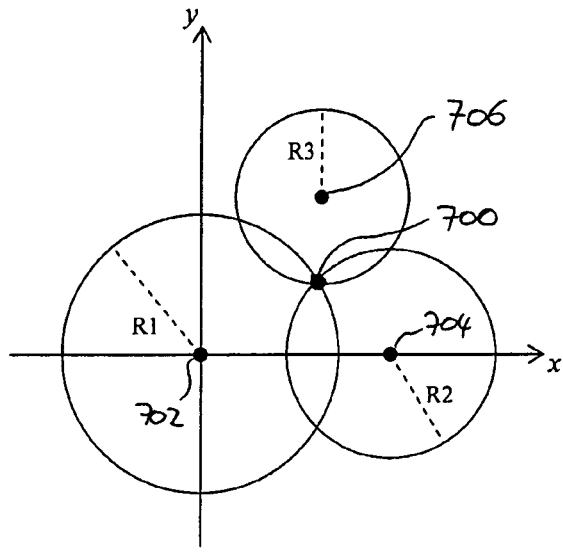
FIG. 7 shows an example of using trilateration to find the location of a node in a two-dimensional space.

FIG. 7 shows an example of trilateration that can be used to determine the position of a point (for example, the position of a node) in two-dimensional space, although this can be extended to three-dimensional space if desired. A node is positioned at a node point 700. A first receiver 702, a second receiver 704 and a third receiver 706 determine their distance from the node point 700, for example as described above. Thus, for example, where the first receiver 702 determines that its distance from the node point 700 is R1, then the node point 700 is a point on a circle of radius R1 centred on the first receiver 702. Similarly, the node point 700 is a point on a circle of radius R2 centred on the second receiver 704, and is also a point on a circle of radius R3 centred on the third receiver 706. (Where the node point 700 is a point in three-dimensional space, the node point 700 is a point on a sphere centred on a receiver instead of a circle.)

The location of the first receiver 702 is chosen as the origin for a coordinate system for determining the location of the node point 700, although any other point may be chosen. The coordinate system is also chosen such that the second receiver 704 is located along the x-axis, although the coordinate system can be chosen so that the second receiver 704 is not located on the x-axis (for example, the second receiver is located on another axis, or another receiver is located on the x- or y-axis). If the node point 700 is at (x, y) and the location in the coordinate system of the second and third receivers 704 and 706 is (a, 0) and (i, j) respectively, then using Pythagoras' theorem gives the following equations:

$$R1^2 = x^2 + y^2 \quad (8)$$

$$R2^2 = (a-x)^2 + y^2 \quad (9)$$

$$R3^2 = (i-x)^2 + (j-y)^2 \quad (10)$$

Subtracting (8) from (9) gives:

$$R1^2 - R2^2 = 2ax - a^2 \quad (11)$$

Rearranging (11) gives:

$$x = (R1^2 - R2^2 + a^2)/2a \quad (12)$$

Substituting (12) into (10) will give the value for y. Thus, the position (x, y) of the node point 700 can be determined, although other methods of determining the position (x, y) may be used.

In practise, the distances R1, R2 and/or R3 may be inaccurate (i.e. they may contain errors). Therefore, the equations (8) to (10) above may not have a solution. Instead, techniques may be used to determine (x, y) in the presence of errors. For example, optimisation techniques may be employed to determine an estimation of (x, y).

For example, the distance from the node to a number of receivers may be determined, the number of receivers being greater than the number required (for example, in a two-dimensional space, three receivers are required, and so the distance to four or more receivers is determined). A least squares method may then be used to minimise the squared error between the calculated (x, y) and the receivers. For example, e1 is a distance (an error) between (x, y) and the nearest point on a circle of radius R1 centred on a first receiver. Similarly, e2, e3 and e4 are error distances associated with second, third and fourth receivers respectively. The estimate of (x, y) is chosen such that the sum of the squares of e1, e2, e3 and e4 is a minimum. Other techniques for choosing an estimate for (x, y) may be used, for example which are more robust against data outliers.

The determination of the position of the remote device can be determined by any of the nodes in the network. For example, in a Zigbee network, a coordinator may collect indications from one or more fixed devices of the distances between the fixed devices and the remote device. The coordinator may then use the indication(s) to determine the position of the remote device. In embodiments of the invention, a node may also calculate the distance between a fixed device and the remote device using indications of timings provided by the fixed device. For example, the fixed device may indicate the time between sending of the range.req communication and receipt of the rangeReq.ack communication.

In embodiments of the invention, the fixed device or devices may not be fixed. Instead, a fixed device may comprise a remote device, i.e. a device whose position may change. Embodiments of the invention may be used, for example, to determine the position of the device before the distance between the device and another remote device is measured. Similarly, the remote device may be in a fixed position.

Embodiments of the invention use the network to convey both position information, such as the location of a remote device, and other information, such as information transmitted by the remote device. For example, in a medical application, a remote device may be used to transmit the position of a patient and data associated with the patient if the patient is carrying the remote device or if the remote device is fixed to the patient.

Figure 8:
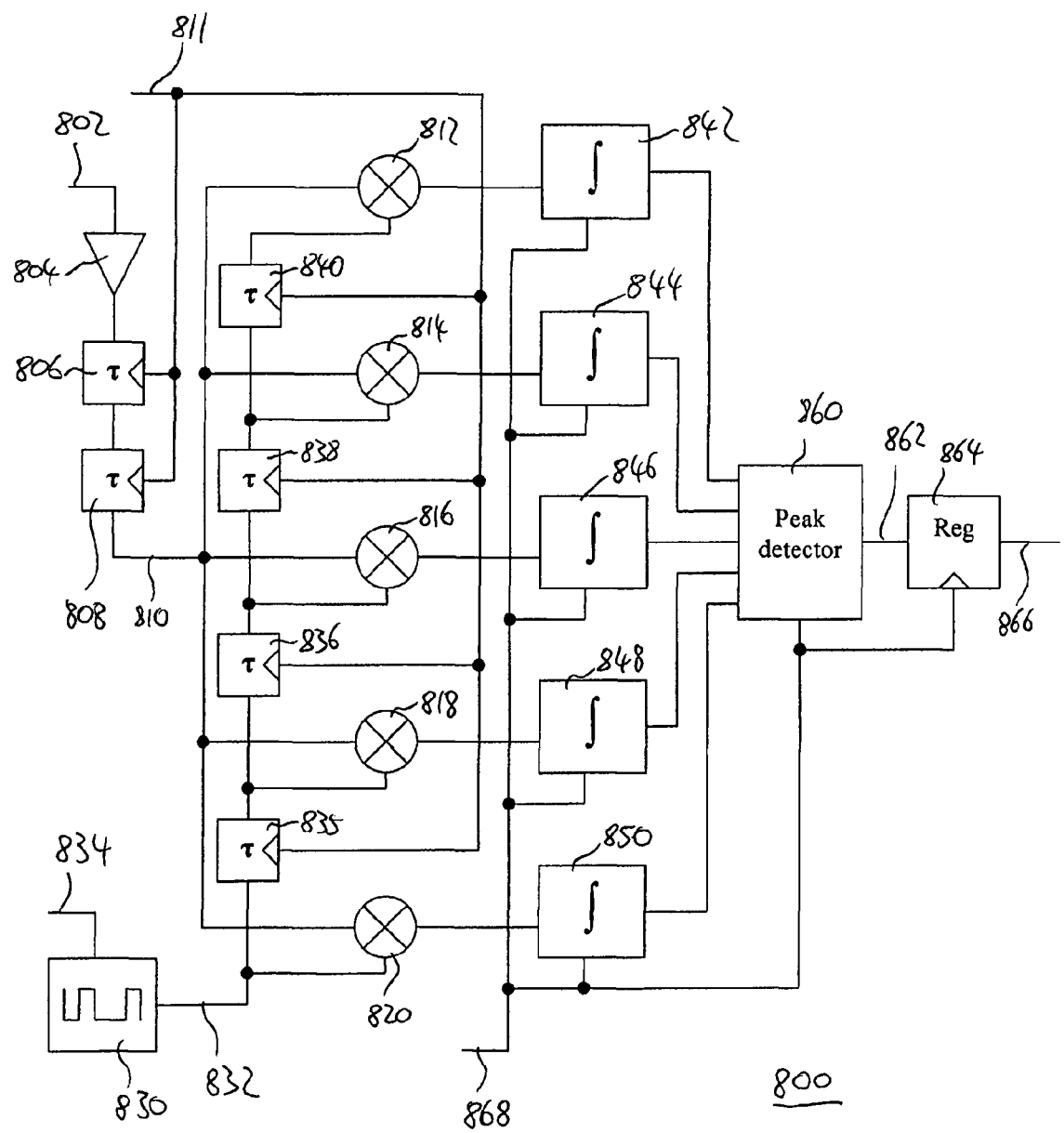
FIG. 8 shows an alternative embodiment of the correlator according to embodiments of the invention.

FIG. 8 shows an alternative embodiment of a correlator 800. The correlator 800 includes an input 802 for an input signal which is provided to a buffer 804. The input 802 may comprise, for example, the output of the receiver portion 404 shown in FIG. 4. The output of the buffer 804 is provided to two series connected delay units 806 and 808. Each delay unit delays the signal provided to its input by a delay factor $\tau$. Thus, the output 810 of the delay unit 808 comprises the input signal 802 delayed by $2\tau$. The delay units are controlled by a clock signal 811. The delayed input signal 810 is provided to one input of each of five analog multipliers 812, 814, 816, 818 and 820.

A chipping sequence generator 830 generates a chipping sequence 832 according to a chipping sequence phase input 834 to the correlator 800. The chipping sequence 832 matches a received communication. For example, where an 802.15.4 communications standard is used, the chipping sequence phase input 834 is used to control the chipping sequence generator 830 such that the chipping sequence 832 comprises a 32-bit sequence that matches the 32-bit sequence provided to the correlator 800. The chipping sequence 832 is provided to the second input of the multiplier 820 and a delay unit 835. The output of the delay unit 835 is provided to the second input of the multiplier 818 and another delay unit 836. The output of the delay unit 836 is provided to the second input of the multiplier 816 and another delay unit 838. The output of the delay unit 838 is provided to the second input of the multiplier 814 and another delay unit 840. The output of the delay unit 840 is provided to the second input of the multiplier 812. Thus, therefore, the time difference between the received signal as seen by the multipliers and the chipping sequence as seen by the multipliers is $+2\tau$, $+\tau$, $0$, $-\tau$ and $-2\tau$ for the multipliers 812, 814, 816, 818 and 820 respectively. That is, for example, the received signal reaches the multiplier 820 $-2\tau$, later than the chipping sequence signal 832. The delay units 835, 836, 838 and 840 are controlled by the clock signal 811.

The outputs of the multipliers 812, 814, 816, 818 and 820 are provided to integrators 842, 844, 846, 848 and 850 respectively. The integrators integrate the outputs of the respective multipliers over time. For example, in embodiments of the invention, the bit stream input 802 comprises a series of bits at voltages $+V$ and $-V$. Similarly, the chipping sequence signal 832 comprises a series of bits at voltages $+V$ and $-V$. Thus, the output of each multiplier comprises a positive or negative voltage depending on the inputs to the multiplier.

The outputs of the integrators 842, 844, 846, 848 and 850 are provided to a peak detector 860. The peak detector 860 determines the timing of a received communication using the outputs of the integrators described in more detail below.

An output 862 of the peak detector 860 indicates the timing and is provided to a register 864 that stores the indication or the timing. The output of the register 866 comprises the output of the correlator 800.

The integrators 842, 844, 846, 848 and 850 can be reset using a reset signal input 868. The reset signal 868 is also used to clock the output 862 of the peak detector 860 into the register 864.

The operation of the correlator 800 is similar to that of the correlator 500 shown in FIG. 5, except that analog components (the multipliers and the integrators) are used to compare the appropriately delayed input and chipping sequence signals and to sum the mismatches. Where there is a mismatch between signals provided to a multiplier (for example, one signal is at $+V$ whereas the other is at $-V$), a negative voltage is output from the multiplier, which causes the associated integrator to reduce its output. Similarly, where there is a match, a positive voltage is output from the multiplier, which causes the associated integrator to increase its output. Therefore, the timing of the received communication can be determined using a method similar to that used in respect of the correlator 500 as indicated above, except that the maximum of the quadratic curve, rather than the minimum, is determined.

In embodiments of the invention, two communications are involved in determining the distance between a fixed device and a remote device: range.req and rangeReq.ack. In these embodiments, timing information about the timing of the receipt of the range.req communication by the remote device is included in the rangeReq.ack communication returned to the fixed device.

In alternative embodiments of the invention, the time taken for a communication to travel from one node to another can be determined using synchronised timers. For example, a remote device may send a communication to a fixed device, and the remote device includes in that communication a time that the communication was sent (which is determined from the remote device's timer). The fixed device receives the communication and determines a timing of the receipt, i.e. the time that the communication was received. The fixed device uses its timer to determine the time that the communication was received, and may subtract from that time a fraction of a clock cycle as determined, for example, using a correlator. The fixed device then subtracts the time that the communication was received from the time that the communication was sent to determine the time taken for the communication to travel from the remote device to the fixed device. The time taken can then be used to determine the distance between the fixed device and the remote device. The communication can be sent by the remote device to the fixed device periodically, for example, or with or without request from the fixed device. The communication could, for example, be received by a plurality of fixed devices, and each device may determine the distance between itself and the remote device.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of determining a position of a node in a wireless modulation technique in which a carrier signal is modulated for wireless communications, the method comprising:
    sending a request for a communication to the node;
    receiving, in response to the request, a wireless communication from the node;
    receiving an information signal modulating and carried by the carrier signal, from the node for specifying a node-processing turnaround time of the node, the turnaround time sufficiently accurate to account for a time span defined between a time at which the request is received by the node and a clock edge of a clock used by the node for processing, the clock edge controlling a time at which receipt of the request is detected by the node, the time span being a non-zero fraction of one cycle of the clock;
    determining a time difference between the sending and the receiving, wherein the time difference includes the turnaround time; and
    calculating a position of the node from the timing.

2. A method as claimed in claim 1, wherein calculating the position of the node includes calculating the distance traveled by the communication from the time difference, and wherein the node is part of a wireless communication network having a communications protocol that specifies a manner in which one or more packets are to be communicated and having a plurality of receivers located at different locations for receiving the communication according to the communications protocol, and wherein the information signal from the node is received by each of the plurality of receivers and used for at least one of the steps of determining and calculating.

3. A method as claimed in claim 1, wherein the communication is an acknowledgement of the request, and wherein the node is part of a wireless communication network having a communications protocol is consistent with IEEE 802.15.4.

4. A method as claimed in claim 1, wherein determining the timing difference comprises determining a time span defined between a time at which the communication is received from the node and the clock edge at which receipt of the communication from the node is detected.

5. A method as claimed in claim 1, wherein determining the timing difference comprises determining the time taken between sending of the communication by the node and the receiving.

6. A wireless network comprising at least one communications device arranged to carry out the method as claimed in claim 1.

7. The method of claim 1, wherein the turnaround time indicates a time span between a time at which the request is received by the node and a time at which the communication is transmitted from the node.

8. The method of claim 1, wherein the turnaround time is indicated by the information signal in units of clock cycles used by the node for processing.

9. The method of claim 1, wherein the time span between a time at which the request is received by the node and a time at which the communication is transmitted from the node is less than one of the clock cycles used by the node for processing.

10. A method of determining the position of a node in a wireless modulation technique in which a continuous carrier signal is modulated for wireless communications, the method comprising:
    sending, from each of a plurality of receivers, a respective request for a first communication to a node;
    receiving, at each of a plurality of receivers, a respective wireless communication from the node in response to the request:
    receiving, at each of the plurality of receivers, an information signal modulating and carried by the carrier signal, from the node for specifying a node-processing turnaround time of the node, the turnaround time sufficiently accurate to account for a time span defined between a time at which the request is received by the node and a clock edge of a clock used by the node for processing, the clock edge controlling a time at which receipt of the request is detected by the node;
    determining a plurality of respective timings for the receiving, comprising determining a respective time difference between the sending by the receiver and the receiving by the receiver, wherein the respective time difference includes the turnaround time; and
    calculating a position of the node from a plurality of respective timings.

11. A method as claimed in claim 10, wherein the plurality of respective timings comprises a plurality of respective times taken for the communication to be sent from the node to each of the respective receivers.

12. A method as claimed in claim 11, wherein determining the plurality of respective timings comprises determining, for each receiver, a respective fraction of a clock cycle between when the respective communication is received by the receiver and the clock edge at which receipt of the respective communication is detected by the receiver.

13. A method as claimed in claim 10, wherein calculating the position of the node comprises calculating the distance traveled by the communication from the respective time differences.

14. A method as claimed in claim 10, wherein each respective communication includes an acknowledgement of the respective request.

15. A system for determining the position of a node as claimed in one of claim 1 or 10.

16. A system for determining the position of a node, comprising:
    a plurality of receivers for receiving communications from the node using a wireless modulation technique in which a carrier signal is modulated for providing the communications, wherein each receiver is arranged to send to the node a request for a respective wireless communication from the node, to receive a respective wireless communication in response to the request, to receive an information signal modulating and carried by the carrier signal from the node for specifying a node-processing turnaround time of the node, the turnaround time sufficiently accurate to account for a time span defined between a time at which the request is received by the node and a clock edge of a clock used by the node for processing, the clock edge controlling a time at which receipt of the request is detected by the node;

a circuit for determining a respective timing for the communication received by a respective one of the receivers, comprising determining the respective time difference between sending the request and receiving the respective communication, wherein the respective time difference includes the turnaround time; and a circuit for determining the position of the node from at least one of the respective timings.

17. A system as claimed in claim 16, wherein the circuit for determining the position of the node includes circuitry for determining the position of the node from at least one of the respective time differences.

18. A communications device comprising:
circuitry configured and arranged to
receive a request for a node-processing turnaround time from a node; and
send a wireless communication using a wireless modulation technique in which a continuous carrier signal is modulated for providing the wireless communication for specifying the turnaround time of the communications device, the turnaround time sufficiently accurate to account for a time span defined between a time at which the request is received by the communications device and a clock edge of a clock used by the communications device for processing, the clock edge controlling a time at which receipt of the request is detected by the communications device.

19. A device as claimed in claim 18, wherein the circuitry is further configured and arranged to send an acknowledgement of the request to the node.

20. A device as claimed in claim 19, wherein the turnaround time includes an indication of a number of clock cycles between the time at which receipt of the request is detected and sending of the acknowledgement and a fraction of a clock cycle between a time that the request is received by the device and the clock edge.

21. A communications device of claim 18, wherein the turnaround time of the communication includes the time span defined between the time at which the request is received by the node and the clock edge and another time span defined between the clock edge and a time at which the communication is specifying the turnaround time is sent.

22. A communications device of claim 18, the communications device including:
a receiver circuit configured and arranged to
receive a signal corresponding to the request;
introduce a timing delay that are responsive to clock edges of the clock, and
determine the clock edge at which the request is detected; and
a correlator circuit configured and arranged, in response to a chipping signal to
measure, in response to the timing delay, a phase difference between the signal and the clock, and
determine, in response to the measured phase difference, the time span defined between the time at which the request is received by the node and the clock edge.

23. A communications device of claim 18, wherein the communications device includes:
a receiver circuit configured and arranged to introduce delays to a request signal corresponding to the request at clock edges of the clock; and
a correlator circuit having
a chipping circuit configured and arranged to generate a chipping signal in response to a start of frame delimiter of the signal,
a plurality of delay circuits configured and arranged to delay the chipping signal and thereby generate a plurality of reference signals having different phases, and
a logic circuit configured and arranged to determine a phase difference between each of the reference signals and the request signal, and determine the time span as a function of the determined phase differences.

24. A communications device of claim 23, wherein the logic circuit includes, for each of the plurality of reference signals:
an XOR circuit having a first input configured and arranged to receive the request signal, as delayed, and a second input configured and arranged to receive the reference signal;
an up/down counter circuit configured and arranged to
increase a value of a generated output signal in response to a first output value of the XOR circuit; and
decrease the value of the generated output signal in response to the output of the XOR circuit having second, different output value; and
a peak detector circuit configured and arranged to determine the time span as a function of the output signals generated by the up/down counters.

25. A method as claimed in claim 1, wherein the position of the node is calculated based on a distance from the node and a value indicative of speed of light.

26. A method as claimed in claim 1, wherein the step of receiving includes receiving multiple wireless communications from the node, each of the multiple wireless communications conveying data using the wireless modulation technique, in which a phase of the carrier signal is different for each of the multiple wireless communications.

27. A method as claimed in claim 1, wherein the wireless modulation technique is consistent with one of the modulation modes of IEEE 802.15.4, and wherein said one of the modulation modes of IEEE 802.15.4 is used for specifying, via the information signal, the node-processing turnaround time of the node.

28. A method as claimed in claim 1, wherein the wireless modulation technique conveys data, including the information signal, by shifting or changing a phase of the carrier signal.

29. A method as claimed in claim 1, wherein the wireless modulation technique conveys data, including the information signal, by using a form of phase shift keying (PSK) to modulate the carrier signal.

30. A method as claimed in claim 1, wherein the wireless modulation technique is consistent with a Zigbee protocol under IEEE 802.15.4 and is used for specifying, via the information signal, the node-processing turnaround time of the node.

31. A method as claimed in claim 1, wherein the wireless modulation technique uses a form of quadrature phase shift keying (QPSK) in which a phase of the carrier signal is changed to convey data, including the information signal.

32. A method as claimed in claim 1, further including the step of using the calculated position of the node to locate the node within a facility.

33. A method as claimed in claim 1, wherein the position of the node is calculated based on a distance from the node and a value indicative of speed of light, and wherein the wireless modulation technique uses a chipping signal to convey the data, including the information signal, by matching the chipping signal to the wireless communication received from the node.

34. A method as claimed in claim 1, wherein the position of the node is calculated based partly on a value indicative of speed of light, and wherein the wireless modulation technique uses circuitry to provide delays, to the wireless communication received from the node, relative to and for alignment with a reference signal.

35. A method as claimed in claim 1, wherein the wireless modulation technique uses a form of spread spectrum for conveying data including the information signal.

36. A method as claimed in claim 1, wherein the wireless modulation technique is a phase-shift-keying modulation technique for keying data via the carrier signal.

37. A method as claimed in claim 1, wherein the wireless modulation technique is a shift-keying modulation technique in which the carrier conveys data, including the information signal, by temporarily shifting a phase or frequency of the carrier signal and thereby conveying different bits of data by temporary shifts of the carrier signal.

38. A method as claimed in claim 1, wherein the wireless communication received from the node conveys an acknowledgement, the beginning of which is sent to the node after a delay in response to receipt of the request for a communication to the node, wherein the delay is subject to a variance that is not greater than a time period defined by a clock internal to the node and a calculation or value indicative of speed of light.

39. A method as claimed in claim 18, further including measuring a turnaround time relative to sending a request to the node and receiving a wireless communication from the node in response, wherein the wireless communication received from the node conveys an acknowledgement, the beginning of which is sent to the node after a variable delay that is set based on the turnaround time.

40. A communications device as claimed in claim 18, wherein the position of the node is calculated based on a distance from the node and a value indicative of speed of light.

41. A communications device as claimed in claim 18, wherein the step of receiving includes receiving multiple wireless communications from the node, each of the multiple wireless communications conveying data using the wireless modulation technique, in which a phase of the continuous carrier signal is different for each of the multiple wireless communications.

42. A communications device as claimed in claim 18, wherein the wireless modulation technique is consistent with one of the modulation modes of IEEE 802.15.4, and wherein said one of the modulation modes of IEEE 802.15.4 is used for specifying, via the information signal, the node-processing turnaround time of the node.

43. A communications device as claimed in claim 18, wherein the wireless modulation technique conveys data, including the information signal, by shifting or changing a phase of the continuous carrier signal.

44. A communications device as claimed in claim 18, wherein the wireless modulation technique conveys data, including the information signal, by using a form of phase shift keying (PSK) to modulate the continuous carrier signal.

45. A communications device as claimed in claim 18, wherein the wireless modulation technique is consistent with a Zigbee protocol under IEEE 802.15.4 and is used for specifying, via the information signal, the node-processing turnaround time of the node.

46. A communications device as claimed in claim 18, wherein the wireless modulation technique uses a form of quadrature phase shift keying (QPSK) in which a phase of the continuous carrier signal is changed to convey data, including the information signal.

47. A communications device as claimed in claim 18, further including the step of using the calculated position of the node to locate the node within a facility.

48. A communications device as claimed in claim 18, wherein the position of the node is calculated based on a distance from the node and a value indicative of speed of light, and wherein the wireless modulation technique uses a chipping signal to convey the data, including the information signal, by matching the chipping signal to the wireless communication received from the node.

49. A communications device as claimed in claim 18, wherein the position of the node is calculated based partly on a value indicative of speed of light, and wherein the wireless modulation technique uses circuitry to provide delays, to the wireless communication received from the node, relative to and for alignment with a reference signal.

50. A communications device as claimed in claim 18, wherein the wireless modulation technique uses a form of spread spectrum for conveying data including the information signal.

51. A communications device as claimed in claim 18, wherein the wireless modulation technique is a phase-shift-keying modulation technique for keying data via the continuous carrier signal.

52. A communications device as claimed in claim 18, wherein the wireless modulation technique is a shift-keying modulation technique in which the carrier conveys data, including the information signal, by temporarily shifting a phase or frequency of the continuous carrier signal and thereby conveying different bits of data by temporary shifts of the continuous carrier signal.

53. A communications device as claimed in claim 18, wherein the wireless communication received from the node conveys an acknowledgement, the beginning of which is sent to the node after a variable delay that is set in response to a turnaround time measured relative to communications to and from the node.

54. A communications device as claimed in claim 18, wherein the wireless communication received from the node conveys an acknowledgement, the beginning of which is sent to the node after a variable delay that is set in response to a turnaround time measured relative to communications to and from the node and a calculation or value indicative of speed of light.

* * * * *